(12) United States Patent
Falconer

(10) Patent No.: US 10,779,464 B1
(45) Date of Patent: Sep. 22, 2020

(54) SELF PROPELLED ELECTRIC BROADCAST SPREADER

(71) Applicant: Michael J. Falconer, Myakka City, FL (US)

(72) Inventor: Michael J. Falconer, Myakka City, FL (US)

(*) Notice: Subject to any disclaimer, the term of this patent is extended or adjusted under 35 U.S.C. 154(b) by 49 days.

(21) Appl. No.: 16/394,463

(22) Filed: Apr. 25, 2019

(51) Int. Cl.
*A01C 17/00* (2006.01)
*A01C 7/08* (2006.01)

(52) U.S. Cl.
CPC ........... *A01C 17/005* (2013.01); *A01C 7/085* (2013.01); *A01C 17/001* (2013.01)

(58) Field of Classification Search
CPC ...... A01C 17/005; A01C 7/085; A01C 17/001
USPC .............. 239/668, 670, 681, 684, 685, 687
See application file for complete search history.

(56) References Cited

U.S. PATENT DOCUMENTS

| | | | |
|---|---|---|---|
| 3,394,892 A * | 7/1968 | Speicher | E01C 19/203 239/683 |
| 4,352,463 A * | 10/1982 | Baker | A01M 11/00 180/383 |
| 4,487,370 A | 12/1984 | Speicher | |
| 4,798,325 A * | 1/1989 | Block | A01C 15/02 239/156 |
| 5,333,795 A | 8/1994 | Jessen | |
| 5,340,033 A * | 8/1994 | Whitell | A01C 15/007 239/661 |
| 5,860,604 A * | 1/1999 | Kooiker | A01C 17/00 239/670 |
| 6,142,397 A | 11/2000 | Clay | |
| 6,336,600 B1 | 1/2002 | Jessen | |
| 6,851,634 B2 * | 2/2005 | Woodruff | A01C 17/006 239/302 |
| 7,032,694 B2 | 4/2006 | Jessen | |
| 7,066,413 B2 | 6/2006 | Musso et al. | |
| 7,320,192 B2 * | 1/2008 | Algren | A01D 51/007 37/256 |
| 10,194,582 B2 * | 2/2019 | Kline | A01C 17/005 |
| 2010/0132229 A1 | 6/2010 | Chahino | |
| 2010/0133365 A1 * | 6/2010 | Bailey | E01H 1/0809 239/663 |
| 2017/0359951 A1 * | 12/2017 | Horeth | A01C 15/007 |

* cited by examiner

*Primary Examiner* — Christopher S Kim
(74) *Attorney, Agent, or Firm* — Bryan L. Loeffler, Esq.; Loeffler IP Group, P.A.

(57) ABSTRACT

A walk behind broadcast spreader (1) that is propelled by an electric motor (8), rotates a set of powered wheels (7) and an impeller (3). An individual may walk behind the broadcast spreader and simply steer the broadcast spreader as the electric motor propels the broadcast spreader forward.

20 Claims, 4 Drawing Sheets

SELF PROPELLED ELECTRIC BROADCAST SPREADER

FIELD OF THE INVENTION

This invention relates to broadcast spreaders and more specifically a walk behind broadcast spreader that is propelled by an electric motor.

BACKGROUND OF THE INVENTION

A conventional broadcast spreader includes a hopper which holds particulate or granular material to be dispensed across a lawn or other ground surface via an impeller that spins as the broadcast spreader is pushed. The material being dispersed may be seeds, fertilizer, pesticides, ice melting compounds and so forth. The hopper is mounted to a pair of wheels and a gear set is mounted to an axle between the wheels so the gear set rotates the impeller as the wheels are rotated, thereby causing the particulate matter to be distributed as it falls from the hopper onto the spinning impeller.

Conventional manual broadcast spreaders are pushed or pulled over a ground surface by an individual walking behind the spreader and controlling its movement via an elongated handle.

Alternatively, many commercial broadcast spreaders for larger areas of land are towed by a vehicle or mounted to a vehicle, such as a tractor, lawn mower, all-terrain vehicle and so forth.

While these commercial broadcast spreaders are useful for professionals and large land owners, they are not economical for those owning small to medium pieces of land wherein an automated or self-propelled broadcast spreader would be useful and/or a broadcast spreader propelled by a gas-powered engine is unnecessary.

Therefore, a need exists for a walk behind broadcast spreader that is propelled by an electric motor.

SUMMARY OF THE INVENTION

The primary object of the present invention is to provide a walk behind broadcast spreader that is propelled by an electric motor.

The present invention fulfills the above and other objects by providing a walk behind broadcast spreader having a hopper extending upward from a transaxle attached to two powered wheels. The broadcast spreader is controlled via an elongated arm having handles located on a distal end thereof. The powered wheels are rotated by an electric motor connected to the transaxle. In addition, the electric motor rotates an impeller positioned on a vertical axle located between the transaxle and the hopper.

The electric motor is powered by a power source, which is preferably at least one rechargeable battery. The forward and reverse rotation of the powered wheels as well as the speed of rotation of the wheels and impeller is controlled via one or more controls preferably mounted on the handles of the broadcast spreader.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
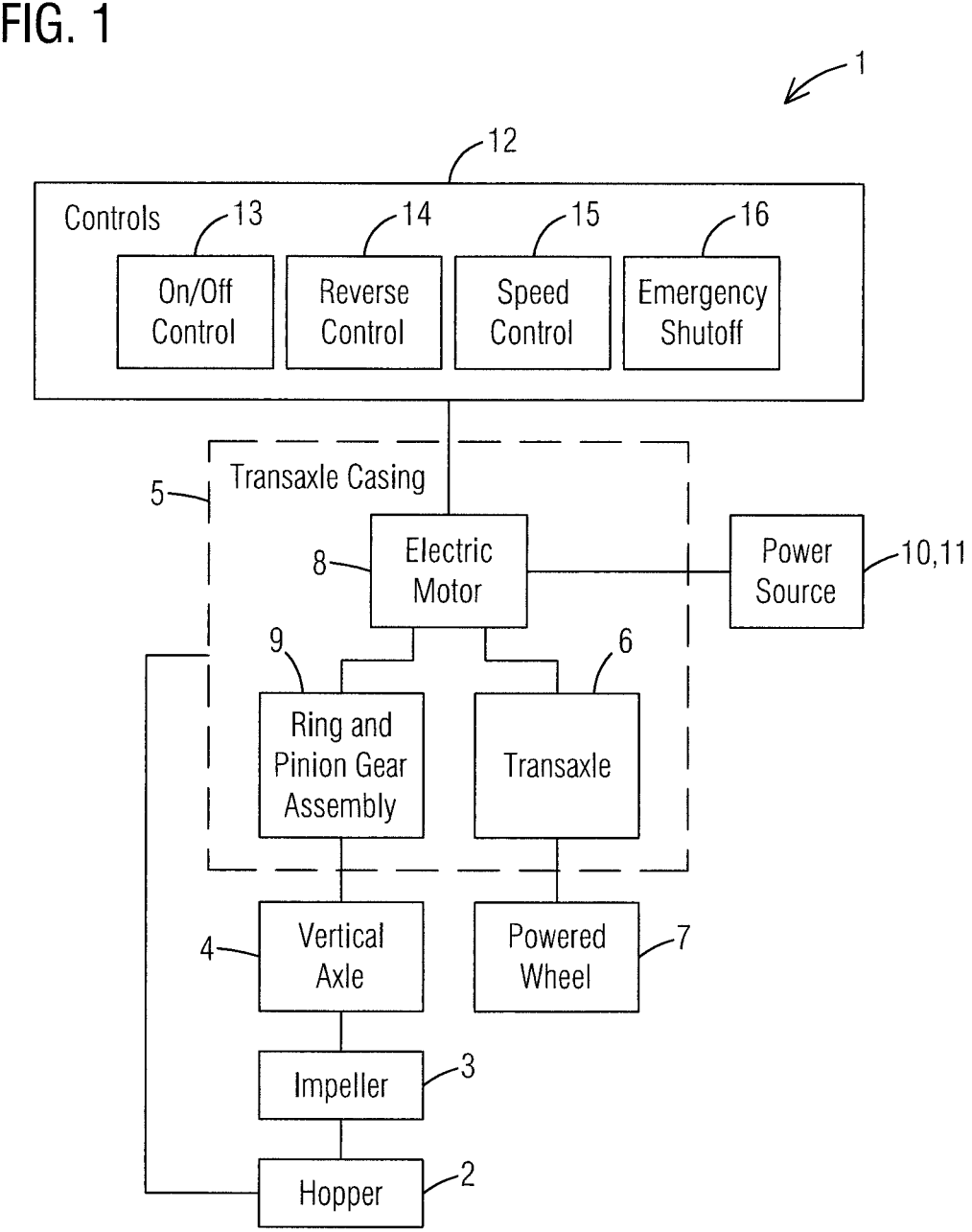
FIG. 1 is a box diagram showing components of a broadcast spreader of the present invention.

For purposes of describing the preferred embodiment, the terminology used in reference to the numbered accessories in the drawings is as follows:

1. broadcast spreader, generally
2. hopper
3. impeller
4. vertical axle
5. transaxle casing
6. transaxle
7. powered wheel
8. electric motor
9. ring and pinion gear assembly
10. power source
11. rechargeable battery
12. control
13. on/off control
14. directional control
15. speed control
16. emergency shutoff control
17. rear support wheel
18. frame
19. elongated arm
20. handle
21. support tray
22. indicator light With reference to FIG. 1, a box diagram showing components of a broadcast spreader 1 of the present invention is illustrated. The broadcast spreader 1 comprises a hopper 2 located in an elevated position over an impeller 3 wherein said impeller 3 is supported by a vertical axle 4 extending upward from a transaxle casing 5 that houses a transaxle 6 and supports two powered wheels 7. The transaxle casing 5 preferably houses an electric motor 8 connected to the transaxle 6 and to the vertical axle 4 by a ring and pinion gear assembly 9. A power source 10, which is preferably at least one rechargeable battery 11. The electric motor 8 is connected to one or more controls 12, such as an on/off control 13, a directional control 14, a speed control 15, an emergency shutoff control 16 and so forth.

Figure 2:
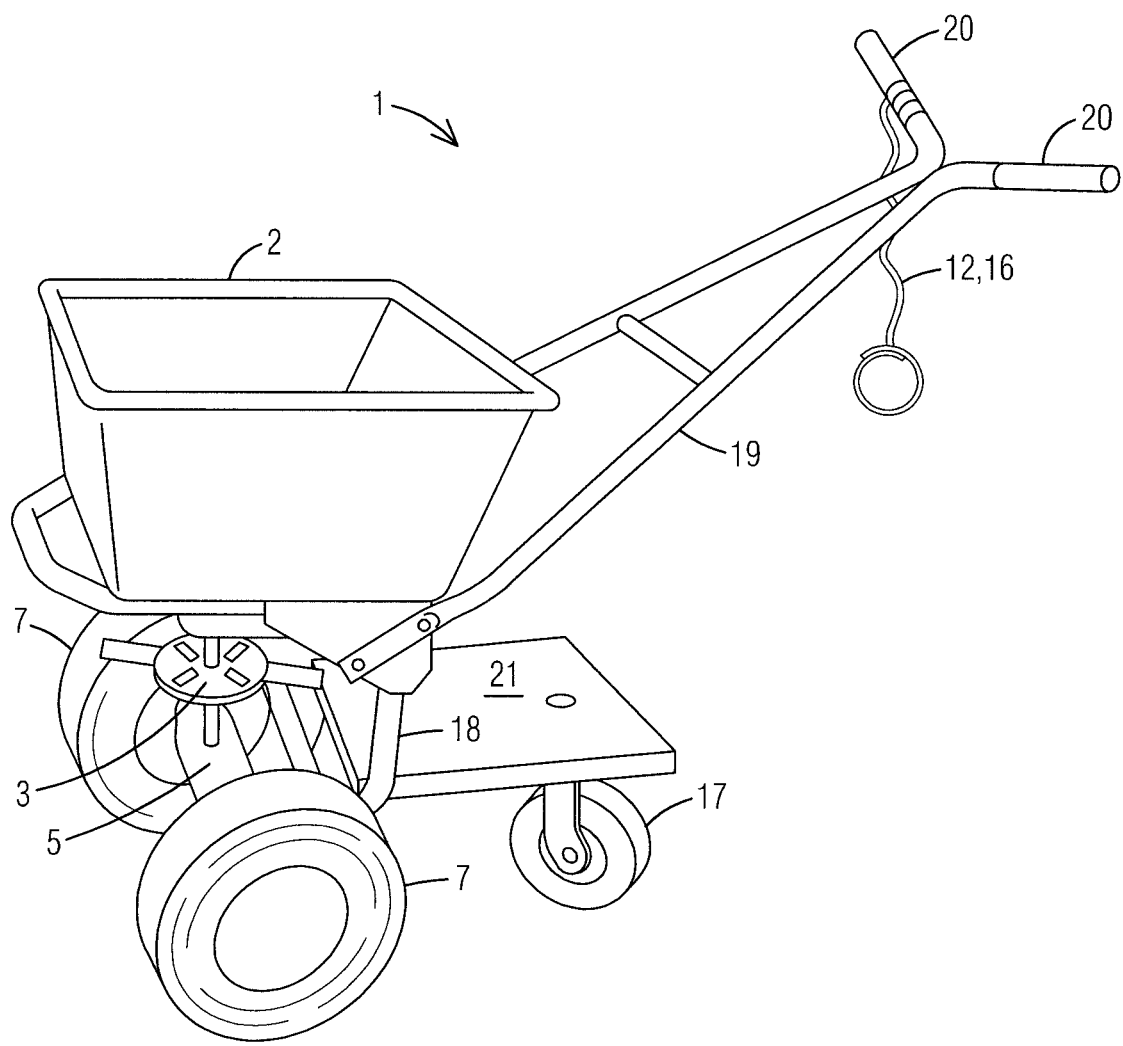
FIG. 2 is a side perspective view of the broadcast spreader of the present invention having a rear support wheel.

With reference to FIG. 2, a side perspective view of the broadcast spreader 1 of the present invention having a rear support wheel 17 is illustrated. The broadcast spreader 1 comprises a hopper 2 supported by a frame 18, wherein said hopper 2 is positioned over an impeller 3 supported by a vertical axle 4 extending upward from a transaxle casing 5 that supports two powered wheels 7.

An elongated arm 19 extends upwardly at an angle away from a rear portion of the hopper 2. Handles 20 are located on a distal end 21 of the elongated arm 19. A rear support wheel 17 is located on the frame 18 below the elongated arm 8. The rear support wheel 17 is preferably rotatable to allow a user to easily turn and steer the broadcast spreader 1. The rear support wheel 17 may be supported by the frame 18 and/or a support tray 21 extending from the frame 18 toward the rear of the broadcast spreader 1. The support tray 21 provides a storage area for the at least one rechargeable battery 11 that acts as a power source 10 to the electric motor 8, as illustrated in FIG. 1.

Figure 3:
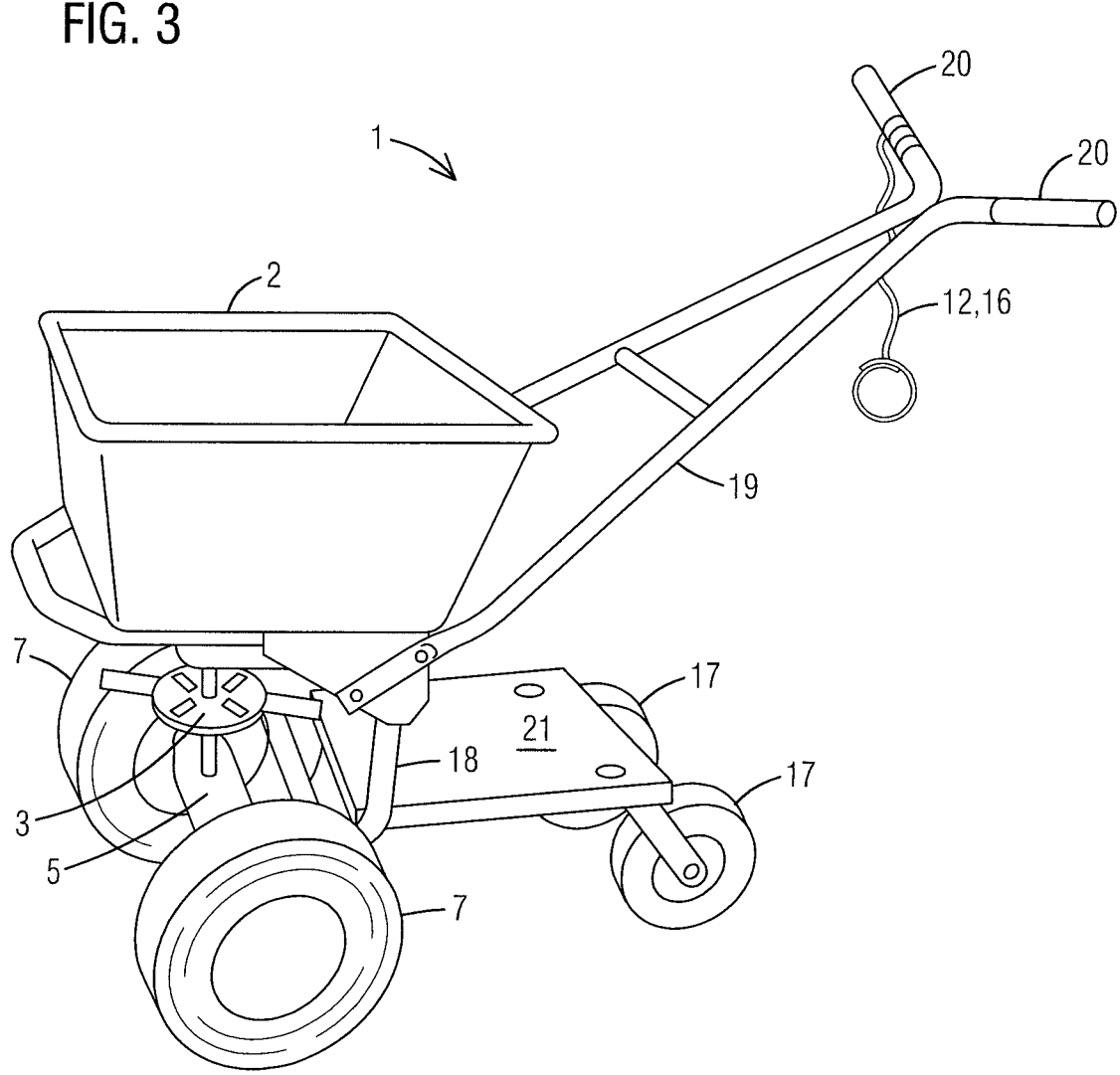
FIG. 3 is a side perspective view of the broadcast spreader of the present invention having two rear support wheel.

With reference to FIG. 3, a side perspective view of the broadcast spreader 1 of the present invention having two rear support wheels 17 is illustrated. The broadcast spreader 1 comprises a hopper 2 supported by a frame 18, wherein said hopper 2 is positioned over an impeller 3 supported by a vertical axle 4 extending upward from a transaxle casing 5 that supports two powered wheels 7.

An elongated arm 19 extends upwardly at an angle away from a rear portion of the hopper 2. Handles 20 are located on a distal end 21 of the elongated arm 8. Support wheels 17 is located on the frame 18 below the elongated arm 8. The support wheel 17 is preferably rotatable to allow a user to easily turn and steer the broadcast spreader 1. The support wheels 17 may be supported by the frame 18 and/or a support tray 21 extending from the frame 18 toward the rear of the broadcast spreader 1.

The support tray 21 provides a storage area for the at least one rechargeable battery 11 that acts as a power source 10 to the electric motor 8, as illustrated in FIG. 1. The support tray 21 may also provide support for the electric motor 8 wherein an axle, as opposed to a transaxle, is connected to the two powered wheels 7 via a chain and sprocket assembly that also causes the impeller 3 to rotate.

Figure 4:
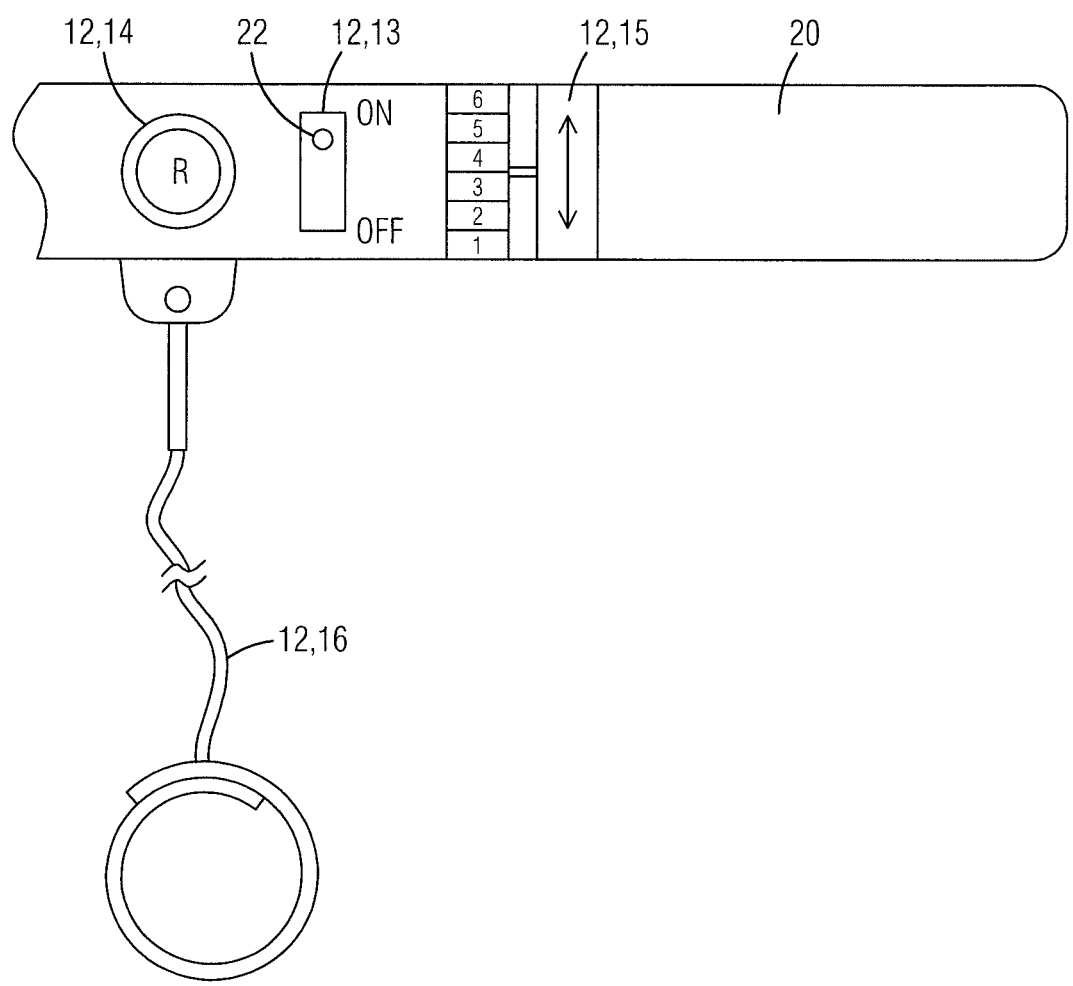
FIG. 4 is a top view of controls located on a handle of the broadcast spreader of the present invention.

With reference to FIG. 4, a top view of controls 12 located on a handle 20 of the broadcast spreader 1 of the present invention is illustrated. The electric motor 8 is connected to at least one control 12 as illustrated in FIG. 1. The at least one control 12 is preferably located on a handle 20 of the broadcast spreader 1. The at least one control 12 may comprise an on/off control 13, a directional control 14 to control forward and/or reverse, a speed control 15, an emergency shutoff control 16 and so forth. The at least one control 12 may be a switch, button, rotatable grip and so forth and may include one or more indicator lights 22 to relay information to a user.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A broadcast spreader comprising:
a hopper supported by a frame in an elevated position over an impeller wherein said impeller is supported by a vertical axle extending upward from a transaxle casing located below the impeller;
said transaxle casing housing a transaxle and supporting two powered wheels;
an electric motor housed within the transaxle casing;
said electric motor being connected to the transaxle;
said electric motor being connected to the vertical axle;
said electric motor being connected to a power source;
an elongated arm extending upwardly at an angle away from a rear portion of the hopper; and
at least one handle located on a distal end of the elongated arm.

2. The broadcast spreader of claim 1 wherein:
said power source is at least one rechargeable battery.
3. The broadcast spreader of claim 1 wherein:
said electric motor is connected to at least one control.
4. The broadcast spreader of claim 3 wherein:
said at least one control is located on the at least one handle.
5. The broadcast spreader of claim 3 wherein:
said at least one control is an on/off control.
6. The broadcast spreader of claim 3 wherein:
said at least one control is a directional control.
7. The broadcast spreader of claim 3 wherein:
said at least one control is a speed control.
8. The broadcast spreader of claim 3 wherein:
said at least one control is an emergency shutoff control.
9. The broadcast spreader of claim 1 wherein:
said electric motor is connected to the vertical axle by a ring and pinion gear assembly.
10. The broadcast spreader of claim 1 further comprising:
at least one rear support wheel.
11. The broadcast spreader of claim 1 further comprising:
a support tray extending from the frame.
12. The broadcast spreader of claim 1 further comprising:
a support tray extending from the frame; and
at least one rear support wheel extending form the support tray.
13. A broadcast spreader comprising:
a hopper supported by a frame in an elevated position over an impeller wherein said impeller is supported by a vertical axle extending upward from a transaxle casing located below the impeller;
said transaxle casing housing a transaxle and supporting two powered wheels;
an electric motor housed within the transaxle casing;
said electric motor being connected to the transaxle;
said electric motor being connected to the vertical axle;
said electric motor is connected to the vertical axle by a ring and pinion gear assembly;
said electric motor being connected to at least one rechargeable battery;
an elongated arm extending upwardly at an angle away from a rear portion of the hopper;
at least one handle located on a distal end of the elongated arm; and
said electric motor is connected to at least one control.
14. The broadcast spreader of claim 13 wherein:
said at least one control is located on the at least one handle.
15. The broadcast spreader of claim 13 wherein:
said at least one control is an on/off control.
16. The broadcast spreader of claim 13 wherein:
said at least one control is a directional control.
17. The broadcast spreader of claim 13 wherein:
said at least one control is a speed control.
18. The broadcast spreader of claim 13 wherein:
said at least one control is an emergency shutoff control.
19. The broadcast spreader of claim 13 further comprising:
at least one rear support wheel.
20. The broadcast spreader of claim 13 further comprising:
a support tray extending from the frame.

* * * * *